(12) United States Patent
Wormsbaecher et al.

(10) Patent No.: US 8,070,611 B2
(45) Date of Patent: Dec. 6, 2011

(54) PLUNGING CROSS-TRACK CONSTANT VELOCITY JOINT

(75) Inventors: Hans Wormsbaecher, Lake Orion, MI (US); Danny Lee Booker, Oakland Township, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 257 days.

(21) Appl. No.: 12/465,300

(22) Filed: May 13, 2009

(65) Prior Publication Data

US 2010/0292016 A1   Nov. 18, 2010

(51) Int. Cl.
*F16D 3/223* (2011.01)
(52) U.S. Cl. .................................. 464/144; 464/906
(58) Field of Classification Search .............. 464/15, 464/140–146, 906
See application file for complete search history.

(56) References Cited

U.S. PATENT DOCUMENTS

| | | | |
|---|---|---|---|
| 3,633,382 A * | 1/1972 | Westercamp | 464/144 |
| 5,292,285 A | 3/1994 | Ingalsbe et al. | |
| 5,647,800 A | 7/1997 | Warnke et al. | |
| 6,071,195 A | 6/2000 | Krude | |
| 6,497,622 B1 | 12/2002 | Bilz et al. | |
| 6,705,947 B1 | 3/2004 | Hildebrandt et al. | |
| 6,736,729 B2 | 5/2004 | Wang et al. | |
| 7,785,205 B2 * | 8/2010 | Hayama | 464/144 |
| 2005/0124422 A1 * | 6/2005 | Mondragon-Parra et al. | 464/144 |
| 2007/0060398 A1 | 3/2007 | Schwarzler et al. | |
| 2009/0017921 A1 * | 1/2009 | Mondragon-Parra et al. | 464/145 |
| 2009/0017922 A1 * | 1/2009 | Mondragon-Parra et al. | 464/145 |
| 2009/0054166 A1 * | 2/2009 | Hoshino et al. | 464/145 |
| 2009/0069101 A1 * | 3/2009 | Hayama | 464/145 |
| 2009/0087250 A1 * | 4/2009 | Une | |

FOREIGN PATENT DOCUMENTS

WO   WO-2005028896   3/2005

OTHER PUBLICATIONS

Universal Joint and Driveshaft Design Manual. Warrendale, PA; Society of Automotive Engineers, 1979. p. 163-166. TJ1059.S62.*

* cited by examiner

*Primary Examiner* — Gregory Binda
*Assistant Examiner* — Josh Skroupa
(74) *Attorney, Agent, or Firm* — Jennifer M. Brumbaugh; Mick A. Nylander; Rader, Fishman & Grauer PLLC (57) ABSTRACT

A cross-track plunging constant velocity joint assembly includes an inner race having an outer diameter, an axial length, inner ball tracks, and a spline engageable with a first torque transfer member. An outer race has an inner diameter, an outer diameter, and outer ball tracks. The outer race is connectable to a second torque transfer member. A cage having multiple windows is disposed between the inner and outer races. A plurality of balls (N) having a ball diameter are held by the cage within the windows and engage pairs of the inner and outer ball tracks. The balls define a joint pitch circle diameter (PCD). The inner race has a plunge depth within the outer race. The ratio of $1.2 \leq$ (outer race outer diameter/outer race inner diameter) $\leq 1.7$ is satisfied.

34 Claims, 6 Drawing Sheets

| PARAMETER NO. | PARAMETER | RANGE |
|---|---|---|
| 1 | outer race outer diameter ($D_{or}$) / outer race inner diameter ($D_{bore}$) | 1.2 – 1.7 |
| 2 | outer race pitch circle diameter ($PCD_O$) / outer race inner diameter ($D_{bore}$) | 0.7 – 0.9 |
| 3 | ball diameter (d) / outer race inner diameter ($D_{bore}$) | 0.22 – 0.28 |
| 4 | plunge depth (PD) / outer race length ($OR_L$) | 1.4 – 1.8 |
| 5 | outer race track depth ($t_D$) / ball diameter (d) | 0.28 – 0.36 |
| 6 | outer race outer diameter ($D_{OR}$) / ball diameter (d) | 5.1 – 6.6 |
| 7 | outer race outer diameter ($D_{OR}$) / ball diameter (d) / outer race track angle ($TA_{OR}$) | 0.34 – 0.48 |
| 8 | inner race length ($IR_L$) / ball diameter (d) | 0.25 – 0.4 |
| 9 | plunge depth (PD) / inner race length ($IR_L$) | 1.3 – 1.8 |
| 10 | ball distance center ($BD_C$) / inner race length ($IR_L$) | 0.13 – 0.19 |
| 11 | spline inner radius ($S_{IR}$) / ball diameter (d) | 0.28 – 0.6 |
| 12 | cage length (B) / ball diameter (d) | 1.5 – 3.0 |
| 13 | cage side cross-sectional area / (((ball diameter (d))$^2$ * N * 0.5 * ((outer race pitch circle diameter ($PCD_O$) + inner race pitch circle diameter ($PCD_I$))/2)/1000) | 0.25 – 0.75 |
| 14 | cage center cross-sectional area / (((ball diameter (d))$^2$ * N * 0.5 * ((outer race pitch circle diameter ($PCD_O$) + inner race pitch circle diameter ($PCD_I$))/2) /1000) | 0.12 – 0.35 |
| 15 | plunge depth (PD) / cage center cross-sectional area | 4.0 – 8.0 |
| 16 | maximum cage inner diameter ($D_i$) / inner race outer diameter ($D_{IR}$) | 1.1 – 1.3 |
| 17 | outer race outer diameter ($D_{OR}$) / minimum cage inner diameter ($d_i$) | 1.1 – 1.3 |
| 18 | ((outer race pitch circle diameter ($PCD_O$) + inner race pitch circle diameter ($PCD_I$))/2) / ball diameter (d) | 3.0 – 3.6 |
| 19 | ((outer race pitch circle diameter ($PCD_O$) + inner race pitch circle diameter ($PCD_I$))/2) / spline pitch circle diameter ($PCD_{spline}$) | 1.8 – 2.8 |

FIG. 6A

| PARAMETER NO. | PARAMETER | RANGE |
|---|---|---|
| 20 | ball diameter (d) / spline pitch circle diameter ($PCD_{spline}$) | 0.45 – 0.75 |
| 21 | (outer race pitch circle diameter ($PCD_O$) – inner race pitch circle diameter ($PCD_I$)) / track angle | 0.0018 – 0.005 |
| 22 | ball window clearance / track angle | 0.002 – 0.01 |
| 23 | long window length ($L_C$) / short window length ($L_S$) | 1.2 – 1.55 |
| 24 | clearance between the cage outer diameter ($D_O$) and the outer race inner diameter ($D_{bore}$) / (outer race pitch circle diameter ($PCD_O$) – inner race pitch circle diameter ($PCD_I$)) | 0.5 – 10 |
| 25 | clearance between the cage outer diameter ($D_O$) and the outer race inner diameter ($D_{bore}$) / backlash | 0.003 – 0.06 |
| 26 | (ball diameter (d))$^2$ * N * 0.5 * ((outer race pitch circle diameter ($PCD_O$) + inner race pitch circle diameter ($PCD_I$))/2) /1000 / outer race outer diameter ($D_{OR}$) | 0.3 – 0.7 |
| 27 | backlash / (outer race pitch circle diameter ($PCD_O$) – inner race pitch circle diameter ($PCD_I$)) | 50 – 600 |
| 28 | ((outer race pitch circle diameter ($PCD_O$) + inner race pitch circle diameter ($PCD_I$))/2) / ((ball diameter (d))$^2$ * N * 0.5 * ((outer race pitch circle diameter ($PCD_O$) + inner race pitch circle diameter ($PCD_I$))/2)) / 1000 | 0.6 – 2.0 |
| 29 | ((ball diameter (d))$^2$ * N * 0.5 * ((outer race pitch circle diameter ($PCD_O$) + inner race pitch circle diameter ($PCD_I$))/2) / 1000 / spline pitch circle diameter ($PCD_{spline}$) | 1.1 – 3.5 |
| 30 | (outer race pitch circle diameter ($PCD_O$) – inner race pitch circle diameter ($PCD_I$)) / ball window clearance | 0.2 – 3.5 |
| 31 | radius at which the balls contact the outer race / radius at which the balls contact the inner race | 1.3 – 1.9 |
| 32 | radius at which the balls contact the outer race / ((outer race pitch circle diameter ($PCD_O$) + inner race pitch circle diameter ($PCD_I$))/2) | 0.45 – 0.9 |
| 33 | radius at which the balls contact the inner race / ((outer race pitch circle diameter ($PCD_O$) + inner race pitch circle diameter ($PCD_I$))/2) | 0.3 – 0.8 |
| 34 | outer race pitch circle diameter ($PCD_O$) – inner race pitch circle diameter ($PCD_I$) | 0 – 0.1 |

FIG. 6B

PLUNGING CROSS-TRACK CONSTANT VELOCITY JOINT

BACKGROUND

Constant velocity joints connecting shafts to drive units are common components in automotive vehicles. The drive unit typically has an output shaft or an input shaft for receiving the joint. Typically, the drive unit is an axle box, transfer case, transmission, power take-off unit or other torque device, all of which are common components in automotive vehicles. Typically, one or two joints are assembled to the shaft to form a propeller or drive shaft assembly. The propeller shaft assembly may be connected, for instance, at one end to the output shaft of a transmission and, at the other end, to the input shaft of a differential. The shaft may be solid or tubular with ends adapted to attach the shaft to an inner race of the joint. An outer race of the constant velocity joint may be connected to the drive unit. The inner race of the joint is typically press fit, splined, or pinned to the shaft, making the outer race of the joint available to be bolted or press fit to a hub connector, flange or stubshaft of the particular drive unit. At the other end of the propeller shaft, a similar connection is made to a second drive unit when connecting the shaft between the two drive units.

Motor vehicles may use propeller or drive shafts to transfer torque via the constant velocity joint from the one input unit to an output unit, for example, from a front drive unit to a rear axle differential such as in rear wheel and all wheel drive vehicles. Propeller shafts are also used to transfer torque and rotational movement to the front axle differential in four-wheel drive vehicles. In particular, two-piece propeller shafts connected by an intermediate joint are commonly used when larger distances exist between the front drive unit and the rear axle of the vehicle. Similarly, inboard and outboard axle drives are commonly used in motor vehicles to transfer torque from a differential to the wheels. The torque transfer is achieved by using a propeller shaft assembly consisting of one or two joints assembled to an interconnecting shaft in the manner indicated above.

Joint types that may be used include Cardan, Hooke or Rzeppa type universal joints. Typically, Rzeppa type constant velocity joints are employed where transmission of a constant velocity rotary or homokinetic motion is desired or required. Constant velocity joints include tripod joint, double offset joint, and cross groove designs having plunging or fixed motion capabilities. The tripod type constant velocity joint uses rollers or trunnions as torque transmitting members and the other constant velocity joint types use balls as torque transmitting members. These types of joints assembled to an interconnecting shaft are applied in inboard axle and outboard axle drives for front wheel drive vehicles and on the propeller shafts found in rear wheel drive, all-wheel-drive, and four-wheel drive vehicles allowing for angular articulation or axial motion. As between the fixed and plunging types of constant velocity joints, the plunging joint typically experience more noise, vibration and harshness ("NVH") issues due to sliding forces as well as clunking noise due to joint tolerances.

The torque transfer capability of a cross-track constant velocity joint is also influenced by its moment of inertia, which is primarily a function of the maximum radii of the constant velocity joint's parts, rather than their mass. Thus, it would be desirable to have an improved cross-track constant velocity joint that benefits from the torque transfer to radius relationship to reduce the mass of the assembly. Moreover, a cross-track constant velocity joint that provides a reduced package size for a particular application would also be of benefit. Also, a cross-track constant velocity joint with optimized ratios would provide additional benefits, such as weight reduction, package size control, reduced part envelope and/or part runout, improved vibration deadening, increased strength per package size, and increased torque transfer capability per unit weight.

BRIEF DESCRIPTION OF THE DRAWINGS

FIGS. 6A and 6B provide a table identifying various design parameters of the exemplary constant velocity joint and their corresponding ranges.

DETAILED DESCRIPTION

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the disclosed device. Further, the descriptions set forth herein are not intended to be exhaustive or otherwise limit or restrict the claims to the precise forms and configurations shown in the drawings and disclosed in the following detailed description.

While the device is described with respect to an exemplary cross-track constant velocity joint (CVJ) for use in a vehicle, the following apparatus is capable of being adapted for various purposes including automotive vehicles drive axles, motor systems that use a propeller shaft, or other vehicles and non-vehicle applications that require CVJ's for torque transmission.

Figure 1:
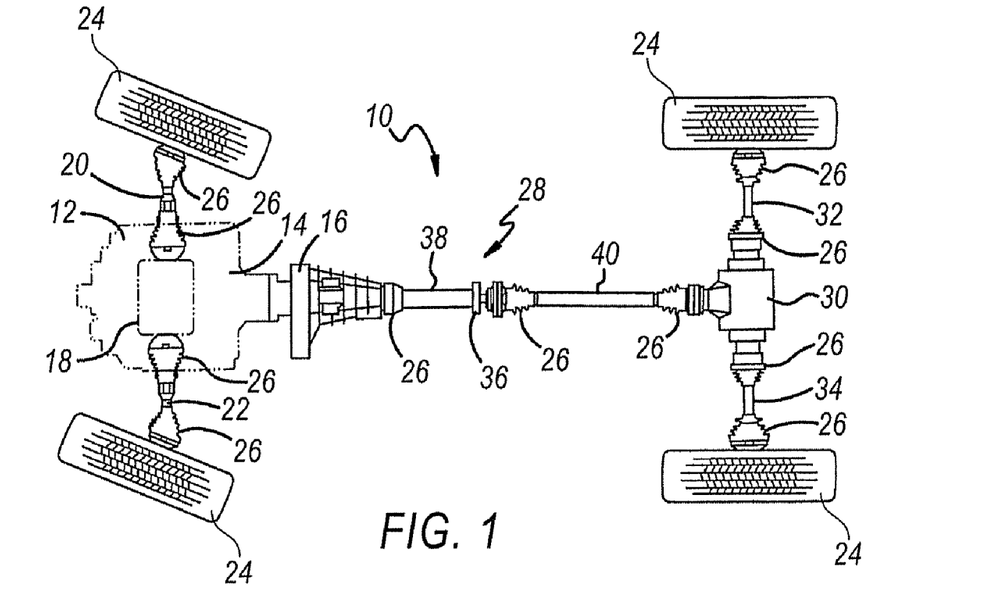
FIG. 1 is a plan view of an automotive drive system for an exemplary four wheel drive vehicle employing an exemplary plunging cross-track constant velocity joint.
Figure 2:
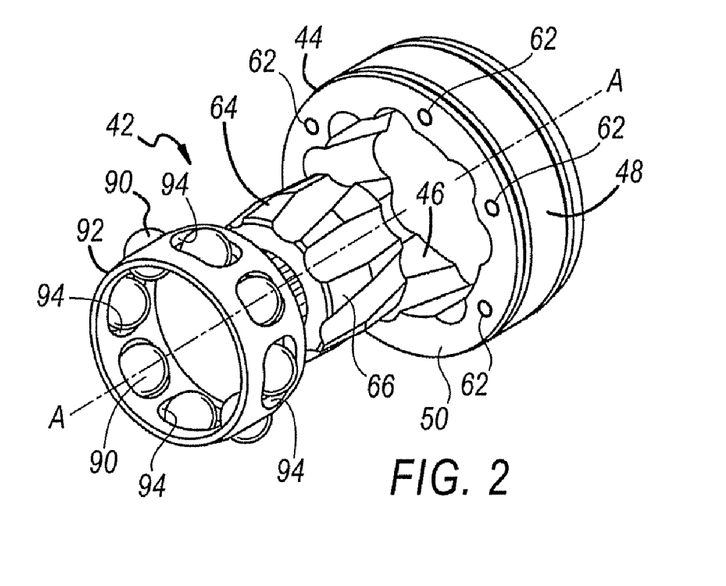
FIG. 2 is an exploded perspective view of the exemplary constant velocity joint.

An exemplary drive system 10 for a typical four-wheel drive vehicle is shown in FIG. 1. While a four-wheel drive system is shown and described, the concepts here presented could apply to a single drive unit system or multiple drive unit system, including rear wheel drive only vehicles, front wheel drive only vehicles, all wheel drive vehicles, and four-wheel drive vehicles.

The exemplary drive system 10 includes an engine 12 that is connected to a transmission 14 and a power take-off unit (PTU) 16. A front differential 18 has a front right hand side half shaft 20 and front left hand side half shaft 22, each of which are connected to a wheel 24 and deliver power to the wheels. Attached to the ends of the right hand side half shaft 20 and left hand side half shaft 22 are constant velocity joints 26. A propeller shaft 28 connects the transmission 18 to a rear differential 30. The rear differential 30 includes a rear right hand side shaft 32 and a rear left hand side shaft 34, each of which has a wheel 24 attached to one end thereof. Constant velocity joints 26 are located on both ends of the half shafts 32, 34 that connect to the wheels 24 and the rear differential 30. The propeller shaft 28 may be a two piece propeller shaft that includes several high-speed constant velocity joints 26 and a high-speed shaft support bearing 36. The propeller shaft 28 includes first and second interconnecting shafts 38, 40. The shafts 20, 22, 38, 40, 32, 34 may be solid or tubular with ends adapted to attach each shaft to a particular constant velocity joint 26, as appropriate for the particular application.

The constant velocity joints 26 transmit power to the wheels 24 through the propeller shaft 28 even if the wheels or the propeller shaft 28 have changed angles due to steering or raising and lowering of the suspension of the vehicle. The constant velocity joints 26 may be any of a variety of joint types, including but not limited to a plunging tripod, a cross groove joint, a fixed joint, a fixed tripod joint, or a double offset joint, all of which are recognized terms for identifying different varieties of constant velocity joints 26. The constant velocity joints 26 allow for constant velocity torque transmission within the joint at operating joint angles that are typically encountered in every day driving of automotive vehicles in both the half shafts and propeller shafts of these vehicles. Optionally, each constant velocity joint may be replaced with any other types of joint. Thus, any of the constant velocity joints identified in FIG. 1 at 26 or 36 may include a constant velocity joint. Because the torque transfer capability of the constant velocity joint is influenced by its moment of inertia, which is a function of the maximum radii of the constant velocity joint parts, and is less effected by the mass of the constant velocity joint parts, it may be beneficial to have a cross-track constant velocity joint with optimized ratios that benefits from the torque/radius transfer relationship in order to reduce the mass of the system or to optimize its performance.

With reference to FIGS. 2 and 3A thru 3C, an exemplary cross-track constant velocity joint 42 may include an annular outer race 44 having a generally cylindrical inner face 46 defining an inner diameter $D_{bore}$, and a generally cylindrical outer face 48 defining an outer diameter $D_{OR}$. Outer race 44 has a front face 50 and a rear face 52 that define an axial outer race length $OR_L$.

Figure 3A:
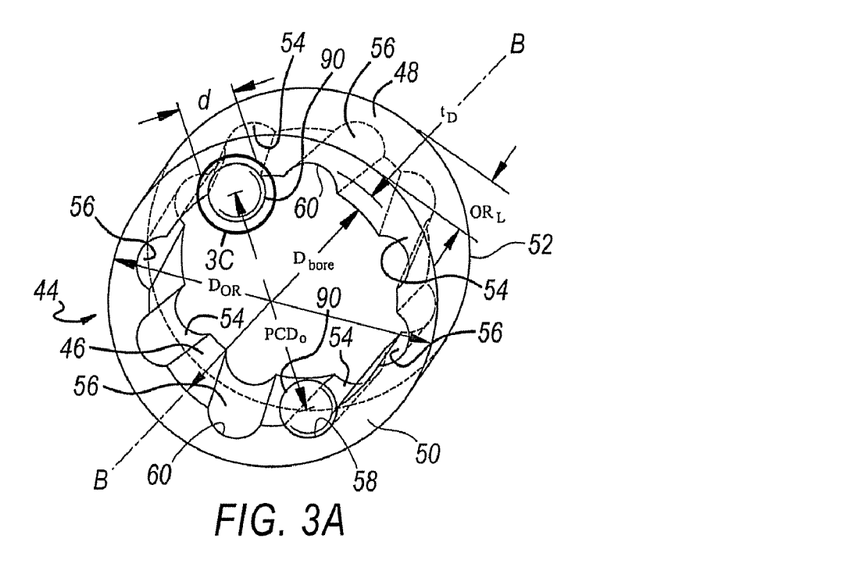
FIG. 3A illustrates an outer joint portion of the exemplary constant velocity joint.
Figure 3B:
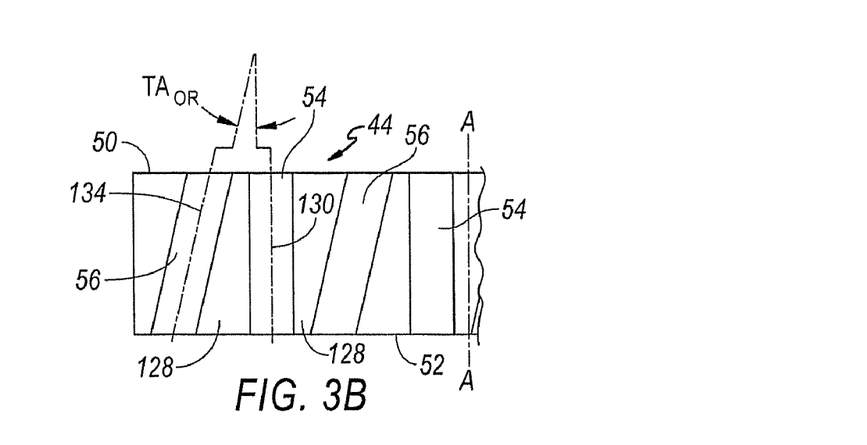
FIG. 3B is an illustration of outer race ball tracks employed with the outer race.

Arranged on inner face 46 of outer race 44 are first and second outer ball tracks 54 and 56. Each outer ball track 54 and 56 has a track depth $t_D$ corresponding to a radial distance measured from inner face 46 to a bottom 58 and 60 of outer ball tracks 48 and 50, respectively. Outer ball tracks 54, 56 have substantially the same track depth $t_D$. Outer ball tracks 54, 56 extend over the entire length $OR_L$ of outer race 44 from front face 50 to rear face 52.

Outer race 44 may be secured to a drive shaft of a drive unit, for example, PTU 16, front differential 18 and rear differential 30, as illustrated in FIG. 1, or any other member capable of transmitting a torque to or from constant velocity joint 42. Various means may be used to attach outer race 46 to the corresponding drive shaft. For example, outer race 46 may be bolted to the drive shaft using a plurality of bolts received in corresponding bolt holes 62 extending lengthwise through outer race 46 from front face 50 to rear face 52. Other connection means may also be employed depending on the requirements of the particular application.

Referring to FIGS. 2 and 5A thru 5D, arranged within outer race 44 is an inner race 64 having an outer face 66 and inner first and second ball tracks 68 and 70. Outer face 66 of inner race 64 has, as seen in longitudinal section (FIG. 5A), a generally roof-shaped contour that is interrupted by the inner ball tracks 68, 70. Outer face may also have any of a variety of other contours, including but not limited to circular, elliptical, parabolic, and linear, to name a few. The roof-shaped outer face 66 includes a generally cylindrical midsection region 72 flanked by generally conical surface portions 74 adjoining the latter tangentially. Midsection region 72 defines a maximum outer diameter $D_{IR}$ of inner race 64. Inner race 64 has a front face 76 and a rear face 78 that define an axial inner race length $IR_L$.

Figure 5A:
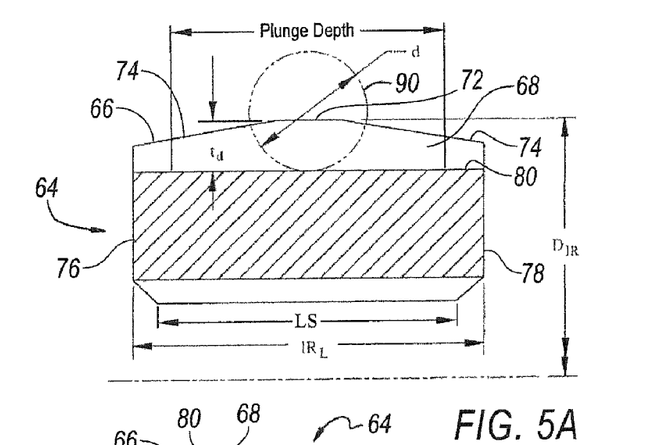
FIG. 5A is a side cross-sectional view of an inner joint portion of the exemplary constant velocity joint.
Figures 5B, 5C, 5D:
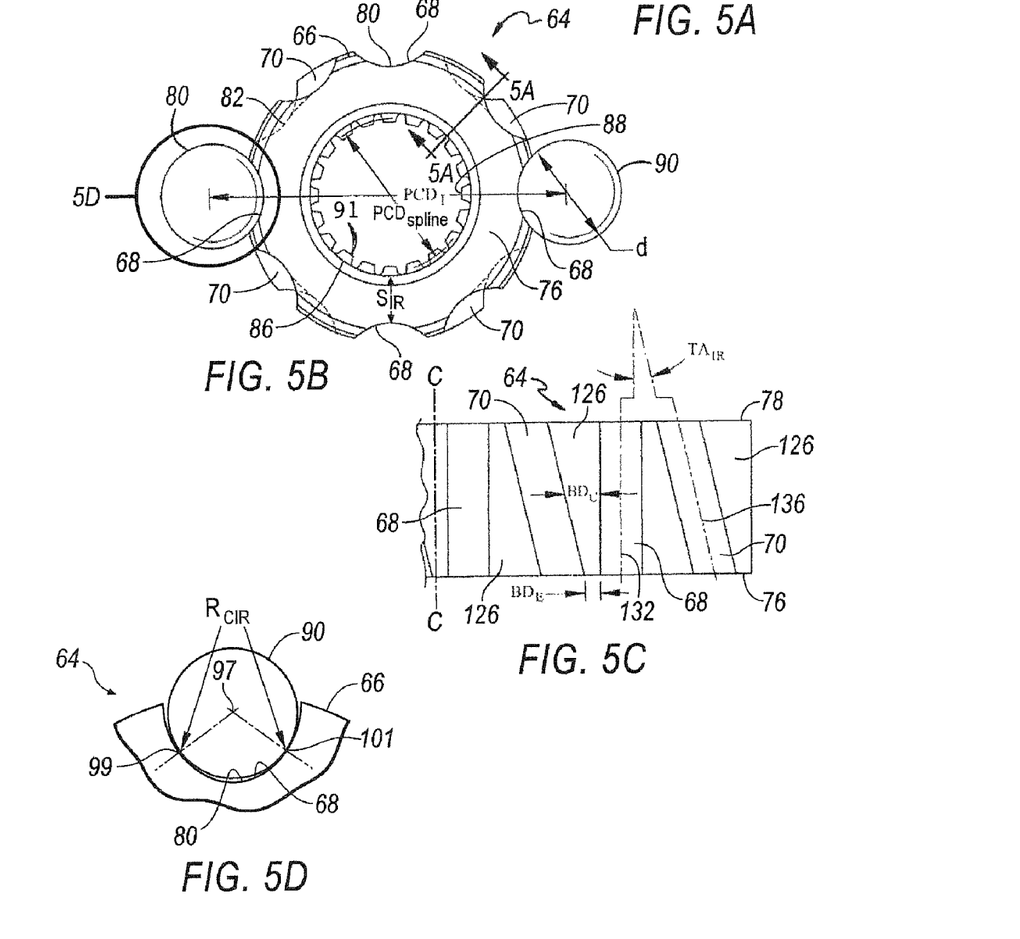
FIG. 5B is a front elevational view of the inner joint portion of the exemplary constant velocity joint.
FIG. 5C is an illustration of inner race ball tracks employed with the inner joint portion of the exemplary constant velocity joint.
FIG. 5D is an enlarged view of the ball employed with the exemplary constant velocity joint shown engaging an inner race of the inner joint portion of the constant velocity joint.

Inner ball tracks 68 and 70 have a track depth $t_d$ corresponding to a radial distance measured from midsection region 72 of outer face 66 of the inner race to a bottom 80, 82 of inner ball tracks 68 and 70, respectively. Inner ball tracks 68, 70 have substantially the same track depth $t_D$. Inner ball tracks 68, 70 extend over the entire length $IR_L$ of inner race 64 from front face 76 to rear face 78.

Inner race 64 may include a central orifice 86 extending lengthwise through the inner race from front face 76 to rear face 78. An inner surface of orifice 86 includes a series of longitudinal toothing 88 defining a spline 91 having a length LS. Orifice 86 is configured for rotationally fixed insertion of a correspondingly configured drive shaft, such as a journal shaft of a drive unit or any other member capable of transmitting a torque to or constant velocity joint 42. The contact points between the spline 91 of inner race 64 and the spline of the drive shaft received in orifice 86 define a spline pitch circle diameter $PCD_{spline}$. The distance from an outer diameter of the spline to the bottom 80, 82 of inner ball tracks 68, 70 corresponds to a spline inner distance $S_{IR}$.

Referring to FIGS. 2 thru 5D, multiple balls 90 having a diameter "d" are guided in pairs of ball tracks consisting in each case of one outer first ball track 54 and one inner first ball track 68, and one outer second ball track 56 and one inner second ball track 70. A cage 92 is arranged between the outer race 44 and the inner race 64, and includes circumferentially distributed windows 94 in which the balls 90 are received. With particular reference to FIGS. 4A and 4B, cage 92 includes a set of long windows 96 and short windows 98 alternately arranged over the circumference of the cage. Large windows 96 have a circumferential length Lc and receive balls 90 guided in the track pairs consisting of outer second ball tracks 56 and inner second ball tracks 70. Small windows 98 have a circumferential length $L_S$ and receive balls 90 guided in the track pairs consisting of outer first ball tracks 54 and inner first ball tracks 68. Long and shorts windows 96, 98 each have a width $W_c$ producing a ball window clearance 100 between a circumferential inside surface 102 of the window and an outer circumference of ball 90 received in the window.

Cage 92 has an inner face 104 and an outer face 106. Inner face 104 includes, as seen in longitudinal section (FIG. 4A), a generally cylindrical recessed midsection region 108 flanked by generally cylindrically shaped surface portions 110 adjoining the latter tangentially. Midsection region 108 defines a maximum cage inner diameter $D_i$ and the adjoining cylindrically shaped surface portions 110 define a minimum cage inner diameter $d_i$. Outer face 106 of cage 92 has, as seen in longitudinal section (FIG. 4A), a generally peaked contour that is interrupted by the windows 94. The outer face 106 includes a generally arcuate midsection region 112 flanked by generally conical surface portions 114 adjoining the latter tangentially. Midsection region 112 defines a maximum outer diameter Do of cage 92. Cage 92 has a front face 116 and a rear face 118 that define an axial cage length B.

Cage 92 has a side cross sectional area 120, as seen in longitudinal section (FIG. 4A), bounded by conical region 114 of cage outer face 106, cylindrical region 110 of cage inner face 104, window circumferential edge 102, and front and rear faces 116, 118 of cage 92. Cage 92 also has a center cross-sectional area 122, as seen in circumferential section (FIG. 4B), bounded by midsection region 112 of cage outer face 106, midsection region 108 of cage inner face 104, and a peripheral end surface 124 of adjacent long and short windows 96, 98.

Continuing to refer to FIGS. 3A thru 5D, the first pairs of tracks that include outer and inner first ball tracks 54, 68, and the second pairs of tracks that include outer and an inner second ball tracks 56, 70, are alternately arranged over the circumference of the respective inner and outer races 64, 44. Multiple webs 126 are formed between each two inner first and second ball tracks 68, 70 that are arranged adjacent to one another in the circumferential direction. Similarly, multiple webs 128 are formed between each two outer first and second ball tracks 54, 56 that arranged adjacent to one another in the circumferential direction. In each case, two first pairs of ball tracks 54, 68 and two balls 90 lie diametrically opposite one another with respect to a joint longitudinal mid-axis A-A. Likewise, in each case, two second pairs of ball tracks 56, 70 and two balls 90 lie diametrically opposite one another with respect to the joint longitudinal mid-axis A-A. With the joint aligned, such that a longitudinal mid-axis B-B of the outer race 44 is substantially aligned with a longitudinal mid-axis C-C of the inner race 64, only the balls 90 guided in the pairs of first ball tracks 54, 68 transfer a torque, whereas an axial force for controlling ball cage 92 occurs at the balls 90 guided by the pairs of second ball tracks 56, 70. When the joint articulates, the balls 90 guided in the pairs of second ball tracks 56, 70 may also transfer torque. The amount of torque transferred is a function of the articulation angle of the joint.

Figure 3C:
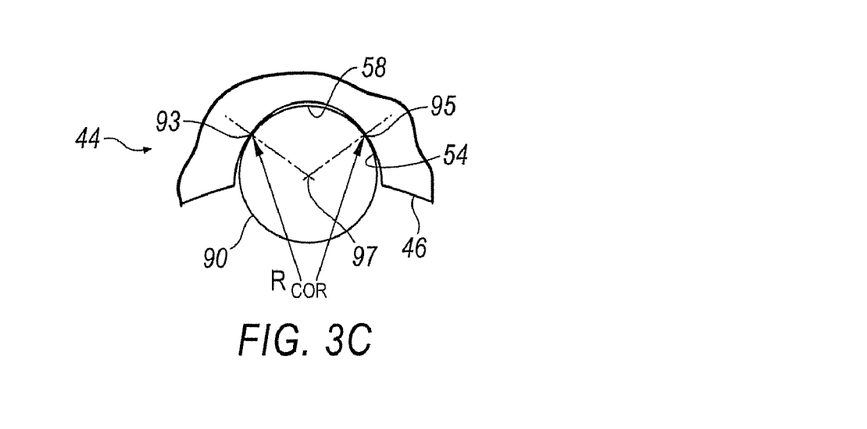
FIG. 3C is an enlarged view of a ball employed with the exemplary constant velocity joint shown engaging an outer race of the outer joint portion of the constant velocity joint.
Figure 4A:
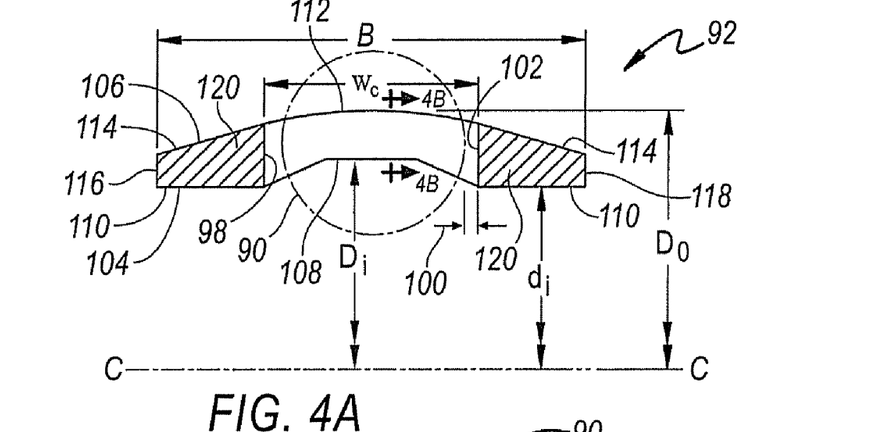
FIG. 4A is a side cross-sectional view of a cage employed with the exemplary constant velocity joint.
Figure 4B:
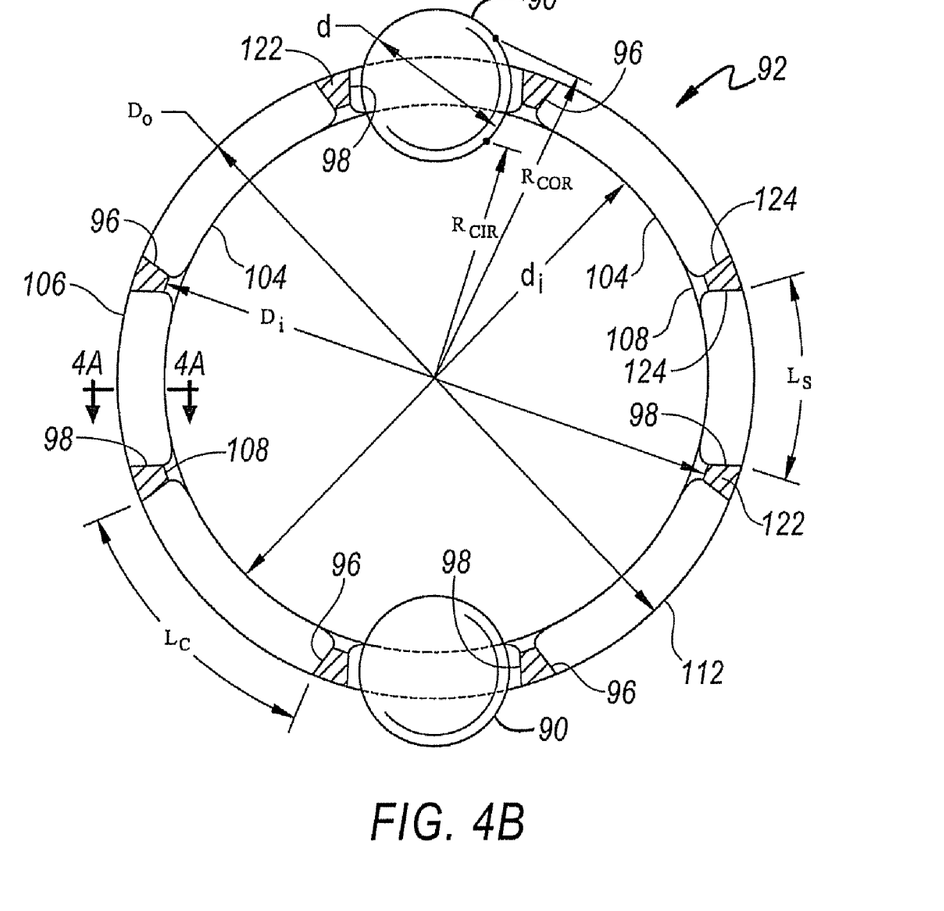
FIG. 4B is a front cross-sectional view of the cage.

Outer first and second ball tracks 54, 56 have a generally elliptical shaped cross-sectional profile, as shown in FIG. 3C. The balls 90 guided in the outer first and second ball tracks 54, 56 engage the tracks at two points 93, 95 located at a radius $R_{COR}$. Center points 97 of a pair of balls 90 seated in diametrically opposite ball tracks 54, 56 define an outer race pitch circle diameter $PCD_O$. Similarly inner first and second ball tracks 68, 70 have a generally elliptical shaped cross-sectional profile, as shown in FIG. 5D. The balls 90 guided in the inner first and second ball tracks 68, 70 engage the tracks at two points 99, 101 located at a radius $R_{CIR}$. Center points 97 of a pair of balls 90 seated in diametrically opposite ball tracks 68, 70 define an inner race pitch circle diameter $PCD_I$.

For purposes of discussion, the constant velocity joint 42 is shown to include four axially parallel pairs of ball tracks 54, 68 and four joint axis-intersecting pairs of ball tracks 56, 70. The pairs of ball tracks are alternately arranged over the circumference of the respective inner and outer races 64, 44, and receive a total of eight balls 90. It shall be appreciated, however, that constant velocity joint 42 may also be configured to include three or five axially parallel pairs of ball tracks 54, 68, and a corresponding number of joint axis-intersecting pairs of ball tracks 56, 70 that alternate over the circumference of the inner and outer races and receive a total of either six or ten balls 90 depending on the number of pairs of ball tracks employed.

With the joint aligned, the outer first ball tracks 54 and the inner first ball tracks 68 have axially parallel center lines 130, 132, respectively. The first ball tracks 54, 68 operate in conjunction with balls 90 to transfer torque between inner race 64 and outer race 44, while providing little or no control of the ball cage 92. The outer second ball tracks 56 form an outer track angle $TA_{OR}$ with the joint longitudinal mid-axis A-A in a radial view, with the joint aligned. The corresponding opposite inner second ball tracks 70 have, with respect to the joint longitudinal mid-axis A-A, an equal and opposite inner track angle $TA_{IR}$ in a radial view, with the joint aligned. This arrangement results in a centerline 136, 134 of the respective inner and outer second ball tracks 58, 50 intersecting one another in a radial view. The balls 90 received by each pair of inner and outer second tracks 70, 56 have their center points 97 located at the intersection point of the centerlines 134, 136 of the second pairs of ball tracks 56, 70.

The second inner ball tracks 70 of the inner race 64 arranged at an inner track angle $TA_{IR}$ relative to the joint longitudinal mid-axis A-A are all obliquely inclined co-directionally with respect to one another. Similarly, the corresponding opposite second outer ball tracks 56 of the outer race 44 are all obliquely inclined co-directionally with respect to one another.

The balls 90 received in the windows 94 of the ball cage 92 control the positioning of ball cage 92 within constant velocity joint 42. The centrally symmetrical arrangement of the balls 90 received in the first ball track pair 54, 68, and the balls 90 received in the second ball track pair 56, 70, results in two torque-transferring balls 90 and two controlling balls 90 lying diametrically opposite one another when the joint is aligned.

The operating and performance characteristics of constant velocity joint 42 may be affected by a variety of parameters. Several of these parameters are listed in the tables shown in FIGS. 6A and 6B. For example, the torque transfer capability of a cross-track constant velocity joint is a function of its mass, material properties and the maximum radii of the constant velocity joint's parts. Thus, the performance characteristics of constant velocity joint 42 may be enhanced by maximizing the torque transfer to radius relationship in order to reduce the mass of the constant velocity joint. Maximizing the performance parameters identified in FIGS. 6A and 6B may provide additional benefits, such as weight reduction, package size control, reduced part envelop and/or part runout, improved vibration deadening, increased strength per package size, and increased torque transfer capability per unit weight. Thirty-four parameters are identified in the tables in FIGS. 6A and 6B. Each parameter includes an identified range that may maximize one or more of the performance characteristics of constant velocity joint 42.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously or generally simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A cross-track plunging constant velocity joint assembly comprising:
    an inner race having inner ball tracks and a spline hole adapted to engage a first torque transfer member;
    an outer race having an outer race length, an outer race outer diameter and an outer race inner diameter, the outer race including outer ball tracks having an outer race track angle and an outer race track depth, the outer race connectable to a second torque transfer member;
    a cage including at least one window, the cage positioned between the inner race and the outer race; and
    a plurality of balls (N) having a ball diameter, the plurality of balls held by the cage within the at least one window and engaging pairs of the inner and outer ball tracks, the balls cooperating with the outer race to define an outer race pitch circle diameter, the inner race having a plunge depth within the outer race;
    wherein $1.2 \leq$ (outer race outer diameter/outer race inner diameter)$\leq 1.7$ is satisfied.

2. The cross-track plunging constant velocity joint assembly of claim 1, wherein $0.7 \leq$ (outer race pitch circle diameter/outer race inner diameter)$\leq 0.9$ is satisfied.

3. The cross-track plunging constant velocity joint assembly of claim 1, wherein $0.22 \leq$ (ball diameter/outer race inner diameter)$\leq 0.28$ is satisfied.

4. The cross-track plunging constant velocity joint assembly of claim 1, wherein $1.4 \leq$ (plunge depth/outer race length)$\leq 1.8$ is satisfied.

5. The cross-track plunging constant velocity joint assembly according to claim 1, wherein $0.28 \leq$ (outer race track depth/ball diameter)$\leq 0.36$ is satisfied.

6. The cross-track plunging constant velocity joint assembly according to claim 1, wherein $5.1 \leq$ (outer race outer diameter/ball diameter)$\leq 6.6$ is satisfied.

7. A cross-track plunging constant velocity joint assembly according to claim 1, wherein $0.34 \leq$ ((outer race outer diameter/ball diameter)/outer race track angle) $\leq 0.48$ is satisfied.

8. A cross-track plunging constant velocity joint assembly comprising:
    an inner race having an inner race length, the inner race including inner ball tracks having an inner race track depth, and a spline hole having a spline inner radius, the spline hole adapted to engage a first torque transfer member;
    an outer race having outer ball tracks, the outer race connectable to a second torque transfer member;
    a cage including at least one window, the cage positioned between the inner race and the outer race; and
    a plurality of balls (N) having a ball diameter and arranged to have a ball distance center, the plurality of balls held by the cage within the at least one window and engaging pairs of the inner and outer ball tracks, the inner race having a plunge depth within the outer race;
    wherein $0.25 \leq$ (ball diameter/inner race length)$\leq 0.4$ is satisfied.

9. The cross-track plunging constant velocity joint assembly of claim 8, wherein $1.3 \leq$ (plunge depth/inner race length)$\leq 1.8$ is satisfied.

10. The cross-track plunging constant velocity joint assembly of claim 8, wherein $0.13 \leq$ (ball distance center/inner race length)$\leq 0.19$ is satisfied.

11. The cross-track plunging constant velocity joint assembly of claim 8, wherein $0.28 \leq$ (spline inner radius/ball diameter)$\leq 0.6$ is satisfied.

12. A cross-track plunging constant velocity joint assembly comprising:
    an inner race having an inner race outer diameter, inner ball tracks, and a spline hole adapted to engage a first torque transfer member;
    an outer race having an outer race outer diameter and outer race ball tracks, the outer race connectable to a second torque transfer member;
    a cage having a cage length, a first cage cross-sectional area comprising an axial cross-section and a second cage cross-sectional area comprising a circumferential cross-section, a cage outer diameter, a first cage inner diameter, a second cage inner diameter and at least one window, the cage positioned between the inner race and the outer race; and
    a plurality of balls (N) comprising a ball diameter, the plurality of balls held by the cage within the at least one window and engaging pairs of the inner and outer ball tracks, the balls cooperating with the outer race to define an outer race pitch circle diameter and the inner race to define an inner race pitch circle diameter, the inner race having a plunge depth within the outer race;
    wherein $1.5 \leq$ (cage length/ball diameter)$\leq 3.0$ is satisfied.

13. The cross-track plunging constant velocity joint assembly of claim 12, wherein $0.25 \leq$ (first cage cross-sectional area/(((ball diameter)$^2$*N*$0.5$*((outer race pitch circle diameter (PCD$_O$)+inner race pitch circle diameter (PCD$_I$))/2)/1000)$\leq 0.75$ is satisfied.

14. The cross-track plunging constant velocity joint assembly of claim 12, wherein $0.12 \leq$ (second cage cross-sectional area/(((ball diameter)$^2$*N*$0.5$*((outer race pitch circle diameter (PCD$_O$)+inner race pitch circle diameter (PCD$_I$))/2)/1000)$\leq 0.35$ is satisfied.

15. The cross-track plunging constant velocity joint assembly of claim 12, wherein $4 \leq$ (plunge depth/second cage cross-sectional area)$\leq 8$ is satisfied.

16. The cross-track plunging constant velocity joint assembly of claim 12, wherein $1.1 \leq$ (first cage inner diameter/inner race outer diameter)$\leq 1.3$ is satisfied.

17. The cross-track plunging constant velocity joint assembly of claim 12, wherein $1.1 \leq$ (outer race outer diameter/second cage inner diameter)$\leq 1.3$ is satisfied.

18. A cross-track plunging constant velocity joint assembly comprising:
    an inner race having an inner race length, an inner race outer diameter, inner ball tracks arranged at a track angle, and a spline hole defining a spline length and having a spline inner radius and a spline pitch circle diameter and adapted to engage a first torque transfer member;

an outer race having an outer race length, an outer race outer diameter, an outer race inner diameter, and an outer race pitch circle diameter, and outer ball tracks arranged at the track angle, the outer race connectable to a second torque transfer member;

a cage having a first cage cross sectional area comprising an axial cross-section and a second cage cross-sectional area comprising a circumferential cross-section, the cage including at least one window having a long window length and a short window length, the cage comprising a cage inner diameter and a cage outer diameter, the cage positioned between the inner race and the outer race; and a plurality of balls (N) having a ball diameter and arranged to have a ball distance center, the balls held by the cage within the at least one window and generating a ball window clearance, the balls cooperating with the outer race and the inner race to define an outer race pitch circle diameter, an inner race pitch circle diameter and a backlash, the inner race having a plunge depth within the outer race part;

wherein $3.0 \leq ((\text{outer race pitch circle diameter (PCD}_O) + \text{inner race pitch circle diameter (PCD}_I))/2)/\text{ball diameter}) \leq 3.6$ is satisfied.

19. The cross-track plunging constant velocity joint assembly of claim 18, wherein $1.8 \leq ((\text{outer race pitch circle diameter (PCD}_O) + \text{inner race pitch circle diameter (PCD}_I))/2)/\text{spline pitch circle diameter}) \leq 2.8$ is satisfied.

20. The cross-track plunging constant velocity joint assembly of claim 18, wherein $0.45 \leq (\text{ball diameter/spline pitch circle diameter}) \leq 0.75$ is satisfied.

21. The cross-track plunging constant velocity joint assembly of claim 18, wherein $0.0018 \leq (((\text{outer race pitch circle diameter}) - (\text{inner race pitch circle diameter}))/\text{track angle}) \leq 0.005$ is satisfied.

22. The cross-track plunging constant velocity joint assembly of claim 18, wherein $0.002 \leq (\text{ball window clearance/track angle}) \leq 0.01$ is satisfied.

23. The cross-track plunging constant velocity joint assembly of claim 18, wherein $1.2 \leq (\text{long window length/short window length}) \leq 1.55$ is satisfied.

24. The cross-track plunging constant velocity joint assembly of claim 18, wherein $0.5 \leq (\text{clearance between the cage outer diameter and the outer race inner diameter}/((\text{outer race pitch circle diameter}) - (\text{inner race pitch circle diameter}))) \leq 10$ is satisfied.

25. The cross-track plunging constant velocity joint assembly of claim 18, wherein $0.003 \leq (\text{clearance between the cage outer diameter and the outer race inner diameter/backlash}) \leq 0.06$ is satisfied.

26. The cross-track plunging constant velocity joint assembly of claim 18, wherein $0.3 \leq ((\text{ball diameter})^2 * N * 0.5 * ((\text{outer race pitch circle diameter (PCD}_O) + \text{inner race pitch circle diameter (PCD}_I))/2)/1000)/\text{outer race outer diameter}) \leq 0.7$ is satisfied.

27. The cross-track plunging constant velocity joint assembly of claim 18, wherein $50 \leq (\text{backlash}/((\text{outer race pitch circle diameter}) - (\text{inner race pitch circle diameter}))) \leq 600$ is satisfied.

28. The cross-track plunging constant velocity joint assembly of claim 18, wherein $0.6 \leq ((\text{outer race pitch circle diameter (PCD}_O) + \text{inner race pitch circle diameter (PCD}_I))/2)/((\text{ball diameter})^2 * N * 0.5 * \text{joint pitch circle diameter}/1000) \leq 2.0$ is satisfied.

29. The cross-track plunging constant velocity joint assembly of claim 18, wherein $1.1 \leq ((\text{ball diameter})^2 * N * 0.5 * ((\text{outer race pitch circle diameter (PCD}_O) + \text{inner race pitch circle diameter (PCD}_I))/2)/1000)/\text{spline pitch circle diameter}) \leq 3.5$ is satisfied.

30. The cross-track plunging constant velocity joint assembly of claim 18, wherein $0.2 \leq (((\text{outer race pitch circle diameter}) - (\text{inner race pitch circle diameter}))/\text{ball window clearance}) \leq 3.5$ is satisfied.

31. The cross-track plunging constant velocity joint assembly of claim 18, wherein $1.3 \leq (\text{radius at which the balls contact the outer race/radius at which the balls contact the inner race}) \leq 1.9$ is satisfied.

32. The cross-track plunging constant velocity joint assembly of claim 18, wherein $0.45 \leq (\text{radius at which the balls contact the outer race}/((\text{outer race pitch circle diameter (PCD}_O) + \text{inner race pitch circle diameter (PCD}_I))/2)) \leq 0.9$ is satisfied.

33. A cross-track plunging constant velocity joint assembly of claim 18, wherein $0.3 \leq (\text{radius at which the balls contact the inner race}/((\text{outer race pitch circle diameter (PCD}_O) + \text{inner race pitch circle diameter (PCD}_I))/2)) \leq 0.8$ is satisfied.

34. A cross-track plunging constant velocity joint assembly of claim 18, wherein $0 \leq (\text{outer race pitch circle diameter} - \text{inner race pitch circle diameter}) \leq 0.1$ is satisfied.

* * * * *